US008902210B2

(12) United States Patent
Moon et al.

(10) Patent No.: US 8,902,210 B2
(45) Date of Patent: Dec. 2, 2014

(54) LIQUID CRYSTAL DISPLAY DEVICE

(75) Inventors: Kyo Ho Moon, Daegu (KR); Chul Gu Lee, Gyeonggi-do (KR); Hoon Choi, Incheon (KR); Yong Soo Cho, Daegu (KR); Sang Kug Han, Gwangju (KR)

(73) Assignee: LG Display Co., Ltd., Seoul (KR)

( * ) Notice: Subject to any disclaimer, the term of this patent is extended or adjusted under 35 U.S.C. 154(b) by 826 days.

(21) Appl. No.: 12/852,683

(22) Filed: Aug. 9, 2010

(65) Prior Publication Data

US 2010/0302230 A1 Dec. 2, 2010

Related U.S. Application Data

(63) Continuation-in-part of application No. 12/556,186, filed on Sep. 9, 2009, now Pat. No. 8,106,864.

(30) Foreign Application Priority Data

Oct. 10, 2008 (KR) ........................ 10-2008-0099404
Oct. 7, 2009 (KR) ........................ 10-2009-0095200

(51) Int. Cl.
*G06F 3/038* (2013.01)
*G09G 5/00* (2006.01)
*G09G 3/36* (2006.01)

(52) U.S. Cl.
CPC ...... *G09G 3/3677* (2013.01); *G09G 2320/0223* (2013.01); *G09G 2320/0252* (2013.01)
USPC ........... 345/212; 345/100; 257/151; 257/366; 257/290; 349/140

(58) Field of Classification Search
USPC .................................................... 345/87, 212
See application file for complete search history.

(56) References Cited

U.S. PATENT DOCUMENTS

| | | | | | |
|---|---|---|---|---|---|
| 5,859,630 | A * | 1/1999 | Huq | | 345/100 |
| 2006/0022275 | A1 * | 2/2006 | Ilicali et al. | | 257/366 |
| 2006/0238482 | A1 * | 10/2006 | Jang et al. | | 345/100 |
| 2007/0158706 | A1 * | 7/2007 | Lai et al. | | 257/290 |
| 2007/0290227 | A1 * | 12/2007 | Liang et al. | | 257/151 |
| 2008/0002125 | A1 * | 1/2008 | Kim | | 349/140 |

* cited by examiner

*Primary Examiner* — Gerald Johnson
(74) *Attorney, Agent, or Firm* — Morgan, Lewis & Bockius LLP

(57) ABSTRACT

An LCD device includes dual gate transistors provided to an output portion of the shift register for outputting a gate voltage. As such, the charge/discharge time of the output portion is reduced so the response time of liquid crystal is improved.

14 Claims, 10 Drawing Sheets

LIQUID CRYSTAL DISPLAY DEVICE

CROSS-REFERENCE TO RELATED APPLICATION

This application is a continuation-in-part application of currently pending U.S. application Ser. No. 12/556,186 filed on Sep. 9, 2009 now U.S. Pat. No. 8,106,864, which claims priority under 35 U.S.C. §119 to Korean Patent Application No. 10-2008-0099404, filed on Oct. 10, 2008, both of which are hereby incorporated by reference. This application further claims priority under 35 U.S.C. §119 to Korean Patent Application No. 10-2009-0095200, filed on Oct. 7, 2009, which is hereby incorporated by reference.

BACKGROUND

1. Field of the Disclosure

This disclosure relates to a liquid crystal display device capable of improving the response time of liquid crystal.

2. Description of the Related Art

Nowadays, image display devices driving pixels arranged in an active matrix shape have been widely researched. The image display devices include liquid crystal display (LCD) devices, organic electro-luminescent display (OLED) devices, and so on.

More specifically, the LCD device applies data signals, corresponding to image information, to the pixels arranged in the active matrix shape and controls the transmissivity of the liquid crystal layer so that the desired image is displayed. To this end, the LCD device includes a liquid crystal panel with the pixels arranged in an active matrix shape, and a drive circuitry driving the liquid crystal panel.

In the liquid crystal panel, gate lines and data lines are arranged to cross each other and pixel regions are defined by the gate lines and the data lines crossing. Each of the pixel regions includes a thin film transistor TFT and a pixel electrode connected to it. The thin film transistor TFT includes a gate electrode connected to the respective gate line, a source electrode connected to the respective data line, and a drain electrode connected to the respective pixel electrode.

The drive circuitry includes a gate driver sequentially applying scan signals to the gate lines and a data driver applying data signals to the data lines. As the gate driver sequentially applies the scan signals to the gate lines, the pixels on the liquid crystal panel are selected in the line unit. Whenever the gate lines are sequentially selected one by one, the data driver applies the data signals to the data lines. As such, the LCD device controls the transmittance of the liquid crystal layer by an electric field which is induced between the pixel electrode and a common electrode and corresponds to the data signal applied to each pixel. Accordingly, the LCD device displays an image.

In order to lower the manufacturing cost, an LCD device of an internal driver type has recently been developed which includes the gate driver and the data driver provided on the liquid crystal panel. In the LCD device of an internal driver type, the gate driver is simultaneously manufactured with the thin film transistors when the thin film transistors are formed on the liquid crystal panel. Meanwhile, the data driver may or may not be provided on the liquid crystal panel.

As the LCD device becomes larger in size, the gate lines lengthen by the increment of screen size so that line resistances increase. This results in the response time of the liquid crystal becoming slower due to the lowered changing rate of the thin film transistor.

In order to improve the response time of the liquid crystal, the channel region of the thin film transistor can be expanded. However, in the LCD device of an internal type, it is difficult to improve the charging rate of the thin film transistor due to an area limitation.

SUMMARY OF THE INVENTION

Accordingly, the present embodiments are directed to an LCD device that substantially obviates one or more of problems due to the limitations and disadvantages of the related art.

An object of the present embodiment is to provide an LCD device that is adapted to improve the response time of liquid crystal by reducing the charge/discharge time of the thin film transistor.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, an LCD device includes: a display panel displaying an image and including a plurality of gate lines and a plurality of data lines arranged thereon; a data driver supplying the data lines of the display panel with data signals corresponding to the image; and a gate driver formed on the display panel and having a plurality of shift registers sequentially shifting a start pulse to be applied to the gate lines. Each of the shift registers includes an output portion with first and second dual gate transistors, and a control portion configured to control the output portion. The first dual gate transistor is configured to include: first and second gate electrodes responsive to a voltage on a first node; a drain electrode receiving a clock signal; and a source electrode connected to the respective gate line, and to selectively apply the clock signal on the drain electrode to the respective gate line according to the voltage on the first node. The second dual gate transistor is configured to include: first and second gate electrodes responsive to a voltage on a second node; a source electrode receiving a first source voltage; and a drain electrode connected to the respective gate line, and to selectively apply the first source voltage to the respective gate line according to the voltage on the second node. The control portion controls the voltages on the first and second nodes.

An LCD device according to another aspect of the present embodiment includes: a display panel displaying an image and including a plurality of gate lines and a plurality of data lines arranged thereon; a data driver supplying the data lines of the display panel with data signals corresponding to the image; and a gate driver formed on the display panel and having a plurality of shift registers sequentially shifting a start pulse to be applied to the gate lines. Each of the shift registers includes an input portion with first and second dual source transistors, an output portion with first and second dual gate transistors, and a control portion disposed between the input and output portions. The first dual source transistor is configured to include: a gate electrode responsive to the start pulse; a drain electrode receiving a first source voltage; and first and second source electrodes connected to a first node. The second dual source transistor is configured to include: a gate electrode responsive to an output signal of the next shift register; a drain electrode connected to the first node; and first and second source electrodes receiving a second source voltage. The first dual gate transistor is configured to include: first and second gate electrodes responsive to a voltage on the first node; a drain electrode receiving a clock signal; and a source electrode connected to the respective gate line, and to selectively apply the clock signal on the drain electrode to the respective gate line according to the voltage on the first node. The second dual gate transistor is configured to include: first and second gate electrodes responsive to a voltage on a second node; a source electrode receiving the second source voltage; and a drain electrode connected to the respective gate line, and to selectively apply the second source voltage to the respective gate line according to the voltage on the second node. The control portion is configured to control the voltages on the first and second nodes.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
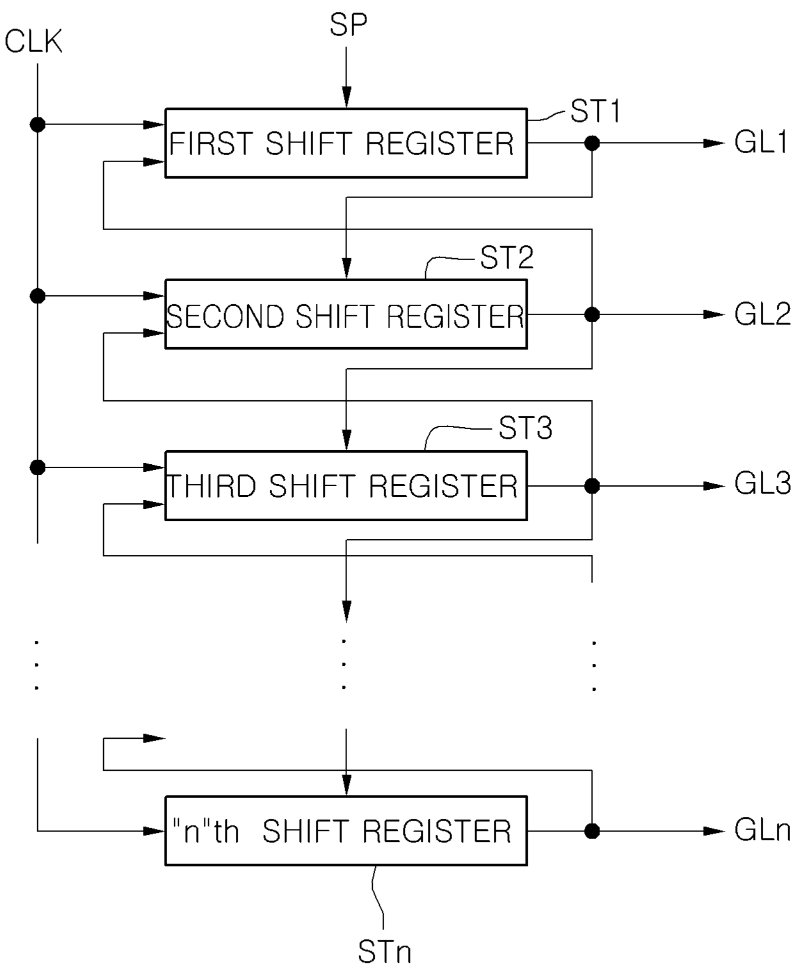
FIG. 1 is a view schematically showing a gate driver according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art.

Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Furthermore, it will be understood that when an element, such as a substrate, a layer, a region, a film, or an electrode, is referred to as being formed "on" or "under" another element in the embodiments, it may be directly on or under the other element, or intervening elements (indirectly) may be present. The term "on" or "under" of an element will be determined based on the drawings. In the drawings, the sides of elements can be exaggerated for clarity, but they do not mean the practical sizes of elements.

FIG. 1 is a view schematically showing a gate driver according to an embodiment of the present disclosure.

Referring to FIG. 1, a gate driver according to an embodiment of the present disclosure includes a plurality of shift registers ST1~STn which are opposite to a plurality of gate lines GL1~GLn, respectively. Each of the shift registers ST1~STn is connected to an input line for a clock signal CLK (hereinafter, "clock signal line CLK"), an output line of a shift register ST positioned at the next stage thereof, and an output line of another shift register ST positioned at the previous stage thereof. The first shift register ST1 is connected to the clock signal line CLK, an output line of the second shift register ST2, and an input line for a start pulse SP (hereinafter, "start pulse line").

Figure 2:
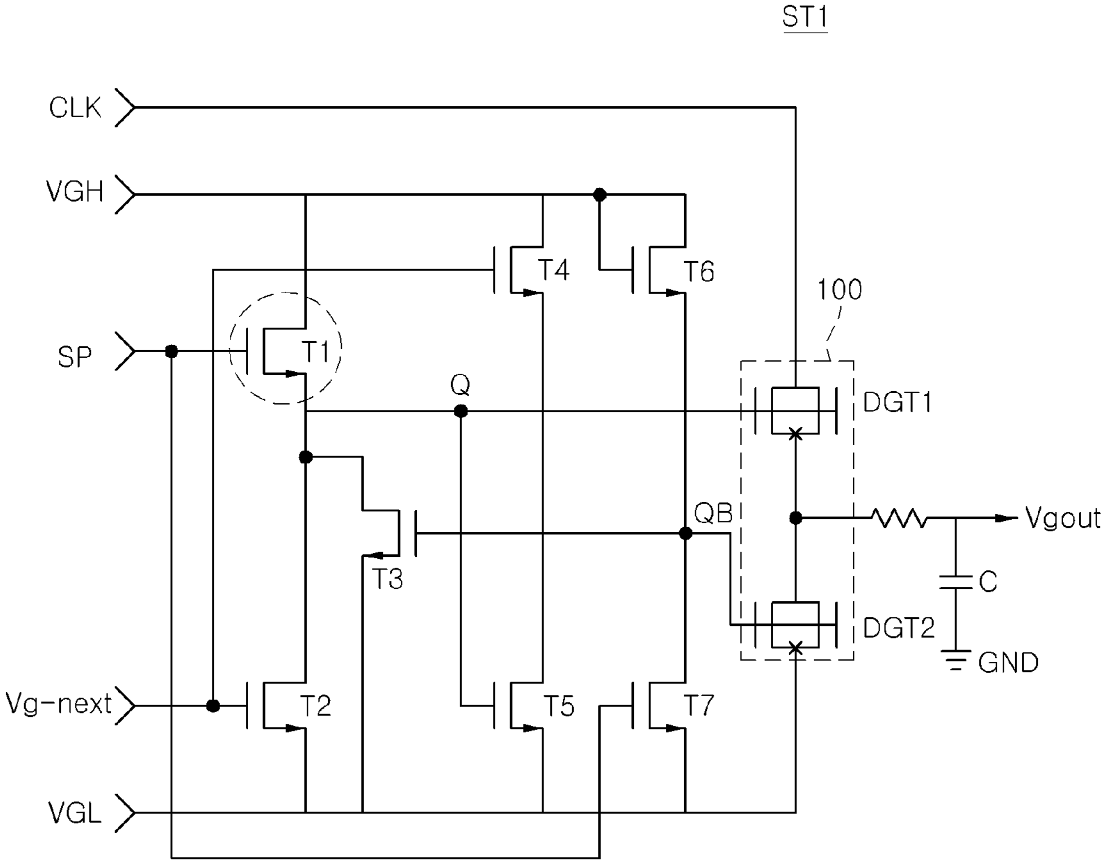
FIG. 2 is a view showing in detail a circuit configuration according a first embodiment of the first shift register shown in FIG. 1.

FIG. 2 is a view showing in detail a circuit configuration according to a first embodiment of the first shift register shown in FIG. 1.

As shown in FIG. 2, the first shift register ST1 inputs the start pulse SP, the clock signal CLK, and an output signal Vg-next of the second shift register ST2 corresponding to the next stage thereof. A gate high voltage VGH and a gate low voltage VGL are applied to the first shift register ST1. Such a first shift register ST1 is configured to include a control portion with first to seventh transistors T1~T7 and an output portion 100 with first and second dual gate transistors DGT1 and DGT2.

The control portion of the first shift register ST1 is configured to include the first to third transistors T1 to T3. The first transistor T1 responds to the start pulse SP. Also, the first transistor T1 is connected between an input line for the gate high voltage VGH (hereinafter, "gate high voltage line") and a first node Q. The second transistor T2 responds to the output signal Vg-next of the second shift register ST2. Also, the second transistor T2 is connected between the first node Q and an input line for the gate low voltage VGL (hereinafter, "gate low voltage line VGL"). The third transistor T3 responds to a voltage on a second node QB. Also, the third transistor T3 is connected between the first node Q and the gate low voltage line VGL.

The control portion of the first shift register ST1 is further configured to include the fourth and fifth transistors T4 and T5. The fourth transistor T4 responds to the output signal Vg-next of the second shift register ST2. Also, the fourth transistor T4 is connected between the gate high voltage line VGH and the second node QB. The fifth transistor T5 responds to the voltage on the first node Q. Also, the fifth transistor T5 is connected between the second node QB and the gate low voltage line VGL.

Such a fourth transistor T4 is selectively turned-on (or activated) depending on the output signal Vg-next which is applied from the second shift register ST2, so that the gate high voltage VGH from the gate high voltage line VGH is be charged into the second node QB. The gate high voltage VGH charged into the second node QB forces the second dual gate transistor DGT2 to be turned-on. As such, the output voltage Vgout on the first gate line GL1 has a low logical state. Also, the fifth transistor T5 has the similar function as the fourth transistor T4. However, the fifth transistor is selectively turned-on depending on the voltage applied to the first node Q, unlike the fourth transistor T4 responding to the output signal Vg-next which is applied from the second shift register ST2.

Moreover, the control portion of the first shift register ST1 is configured to include the sixth and seventh transistors T6 and T7. The sixth transistor T6 responds to the gate high voltage VGH. Also, the sixth transistor T6 is connected between the gate high voltage line VGH and the second node QB. The seventh transistor T7 responds to the start pulse SP. Also, the seventh transistor T7 is connected between the second node QB and the gate low voltage line VGL. These sixth and seventh transistors T6 and T7 are used to function as bias resistors for eliminating noise which can be generated in the output portion 100. The sixth transistor T6 is used to function as a full-up resistor for the voltage on the second node QB. The seventh transistor T7 is used for improving the turning-off time of the second dual gate transistor DGT2.

The output portion 100 of the first shift register ST1 is configured to include the first and second dual gate transistors DGT1 and DGT2. The first dual gate transistor DGT1 selectively applies the clock signal CLK to the first gate line GL1 opposite to the first shift register ST1 according to the voltage on the first node Q. The second dual gate transistor DGT2 responds to the voltage on the second node QB and selectively discharges the output signal of the first dual gate transistor DGT1 which is charged in the first gate line GL1.

Such a first dual gate transistor DGT1 is configured to include a bottom gate electrode connected to the first node Q, a drain electrode connected to the clock signal line CLK, a source electrode connected to the first gate line GL1, and a top gate electrode connected to the first node Q together with the bottom gate electrode. On the other hand, the second dual gate transistor DGT2 is configured to include a bottom gate electrode connected to the second node QB, a drain electrode connected to the first gate line GL1, a source electrode connected to the gate low voltage line VGL, and a top gate electrode connected to the second node QB together with the bottom gate electrode.

Figure 3:
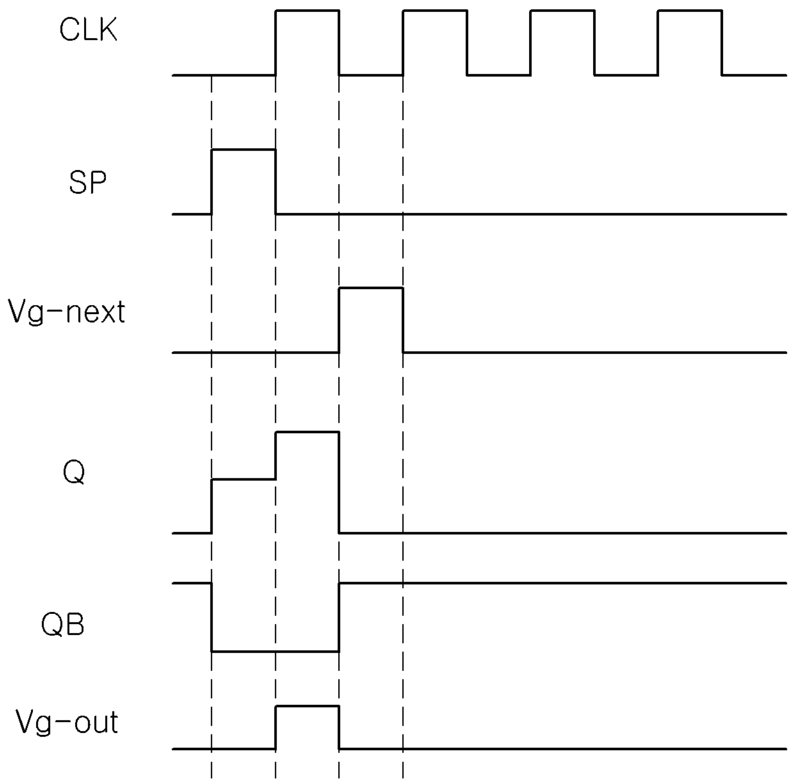
FIG. 3 is a waveform diagram showing drive signals which are applied to the first shift register of FIG. 2.

FIG. 3 is a waveform diagram showing drive signals which are applied to the first shift register of FIG. 2.

As shown in FIGS. 2 and 3, the first shift register ST1 inputs the clock signal CLK, the start pulse SP, and the output signal Vg-next of the second shift register ST2. The clock signal CLK has a fixed period (or a fixed cycle) and high and low state pulses alternating with each other. The start pulse SP has a falling time which is synchronized to a rising time of the first high state pulse of the clock signal CLK. The output signal Vg-next of the second shift register ST2 has a high state pulse synchronized with the first low state pulse of the clock signal CLK.

In a first interval during which the start pulse SP of the high state is applied to the first shift register ST1, the first transistor T1 of the first shift register ST1 is turned-on. Then, the gate high voltage VGH is charged into the first node Q via the source electrode of the first transistor T1. The charged voltage on the first node Q enables the first dual gate transistor DGT1 to be turned-on.

At the same time, the seventh transistor T7 is also turned-on, thereby enabling a voltage on the second node QB to be discharged to the gate low voltage line VGL. As such, the second dual gate transistor DGT2 is turned-off by the discharged voltage on the second node QB.

During a second interval, the start pulse SP goes to a low state and the clock signal CLK of a high state is applied to the first shift register ST1. Then, the first dual gate transistor DGT1 is sufficiently turned-on. In accordance therewith, an output signal Vgout (i.e., a scan signal) with a high voltage level corresponding to the clock signal CLK of the high logic state is applied to the first gate line GL1.

More specifically, the first dual gate transistor DGT1 is sufficiently turned-on by means of a bootstrapped voltage on the first node Q during the second interval. The bootstrapping phenomenon occurs by means of an internal capacitor (or a parasitic capacitor) Cgs formed between the gate electrodes and source electrode of the first dual gate transistor DGT1 when the clock signal CLK goes to a high state. This bootstrapping phenomenon allows the voltage on the first node Q to rise to about two times of the gate high voltage VGH, thereby ensuring a high state. The first dual gate transistor DGT1 sufficiently turned-on applies the clock signal CLK of the high state to the first gate line GL1 as an output signal Vgout of the first shift register ST1.

In this manner, the output signal Vgout with a voltage level corresponding to the clock signal CLK of the high logic state can be applied to the first gate line GL1 as the first dual gate transistor DGT1 is sufficiently turned-on by the bootstrapped voltage on the first node Q, during the second interval.

Sequentially, the first shift register ST1 inputs the clock signal CLK of the low state and receives the output signal Vg-next of the high state from the second shift register ST2 next to the first shift register ST1, during a third interval. At this time, the fourth transistor T4 is turned-on by the output signal Vg-next of the high state from the second shift register ST2 so that the gate high voltage VGH is charged in the second node QB. As such, the second dual gate transistor DGT2 responds to the voltage on the second node QB is turned-on, thereby enabling the gate low voltage VGL to be applied to the first gate line GL1, which is connected to the first shift register ST1, via the second dual gate transistor DGT2. In other words, the first gate line GL1 charges the gate low voltage VGL during the third interval.

Also, as the gate high voltage VGH is charged in the second node QB, the third transistor T3 connected to the second node QB is turned-on. In accordance therewith, the voltage charged in the first node Q changes into the gate low voltage VGL from the gate low voltage line VGL.

In this way, since the gate low voltage VGL and the gate high voltage VGH are applied to the first and second nodes Q and QB of the first shift register ST1, respectively, the first gate line GL1 is charged by the gate low voltage VGL passing through the second dual gate transistor DGT2, during the third interval.

As described above, the first and second dual gate transistors DGT1 and DGT2 each include the bottom and top gate electrodes which are connected to each other. Therefore, the first and second dual gate transistors DGT1 and DGT2 can have fast charging/discharging times in comparison with the ordinary transistor having only the bottom gate electrode.

Moreover, the first through seventh transistors T1 through T7 included in the control portion can be replaced with the dual gate transistors in the same manner as the output portion 100 when it is necessary. If a part or the entire of the first through seventh transistors T1 through T7 within the control portion are replaced with the dual gate transistors with the bottom and top gate electrodes, the charging and discharging times (or rates) in the control portion are proceeded more rapidly. As such, the scan signal can be also applied rapidly to the gate line GL.

Figure 4:
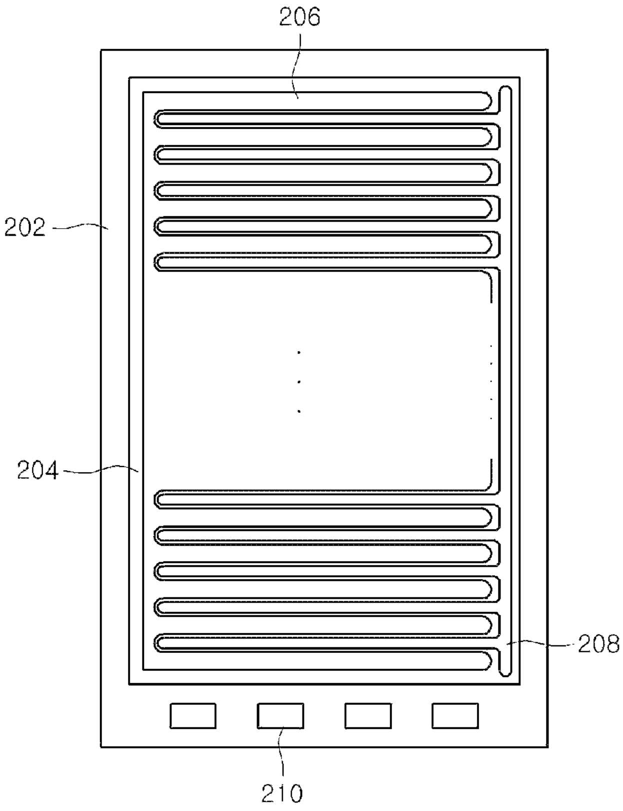
FIG. 4 is a planar view schematically showing the first transistor included in the first shift register of FIG. 2.

FIG. 4 is a planar view schematically showing the first transistor included in the first shift register of FIG. 2.

Referring to FIGS. 2 and 4, the first transistor T1 includes: a gate electrode 202; a gate insulating film (not shown) formed to cover the gate electrode 202; a semiconductor layer 204 formed on the gate insulating film opposite to the gate electrode 202; and a plurality of source and drain electrodes 206 and 208 formed to engage each other on the semiconductor layer 204. The plurality of source and drain electrodes 206 and 208 are separated by a fixed interval from each other. The plurality of source electrodes 206 are electrically connected to one another and the plurality of drain electrodes 208 are electrically connected to one another as well.

Also, a plurality of contact holes 210 are formed on one edge of the gate electrode 208. The plurality of contact holes 210 are used in connecting the first transistor T1 with adjacent other transistors T2, T3, T5, and DGT1. A channel portion is further formed in a surface portion of the semiconductor layer 204 along a gap domain (or a boundary domain) between the plurality of source and drain electrodes 206 and 208 which are separated by the fixed interval from each other.

Figure 5:
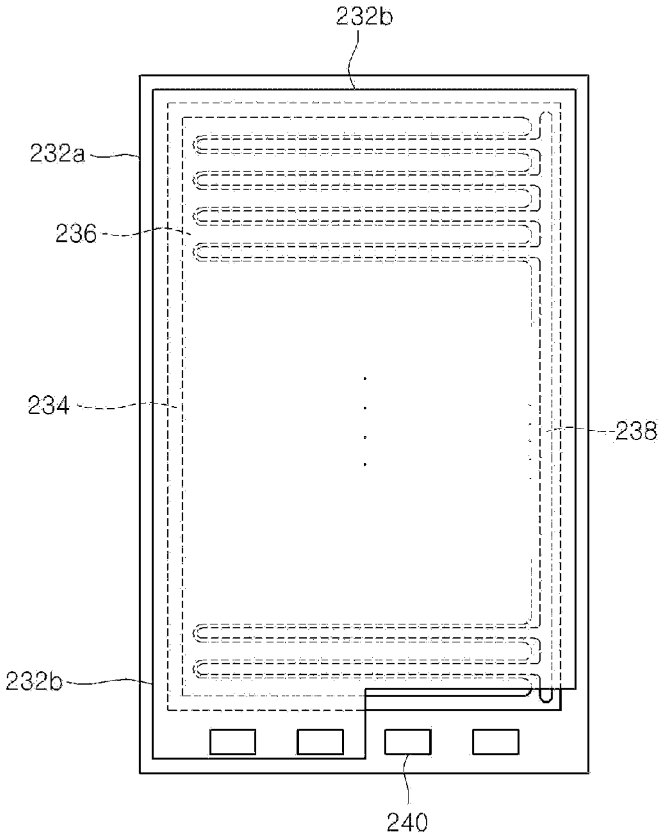
FIG. 5 is a planar view schematically showing a structure of the first dual gate transistor included in the first shift register of FIG. 2.

FIG. 5 is a planar view schematically showing a structure of the first dual gate transistor included in the first shift register of FIG. 2.

As shown in FIGS. 2 and 5, the first dual gate transistor DGT1 includes: a bottom gate electrode 232*a*; a gate insulating film (not shown) formed to cover the bottom gate electrode 232*a*; a semiconductor layer 234 formed on the gate insulating film opposite to the bottom gate electrode 232*a*; a plurality of source and drain electrodes 236 and 238 formed to engage each other on the semiconductor layer; a passivation (or protective) layer (not shown) formed to cover the source and drain electrodes 236 and 238; and a top gate electrode 232*b* formed on the passivation layer and electrically connected to the bottom gate electrode 232*a* through a contact hole which is formed to expose a part of the bottom gate electrode 232*a* by patterning the passivation layer and the gate insulating film. The plurality of source and drain electrodes 236 and 238 are separated by the fixed interval from each other. The plurality of source electrodes 236 are electrically connected to one another, and the plurality of drain electrodes 238 are electrically connected to one another as well.

In this manner, the bottom and top gate electrodes 232*a* and 232*b* of the first dual gate transistor DGT1 are electrically connected with each other. As such, the first dual gate transistor DGT1 has an enhanced turning-on/off characteristic in comparison with that of the first transistor T1 of FIG. 4.

Figure 6:
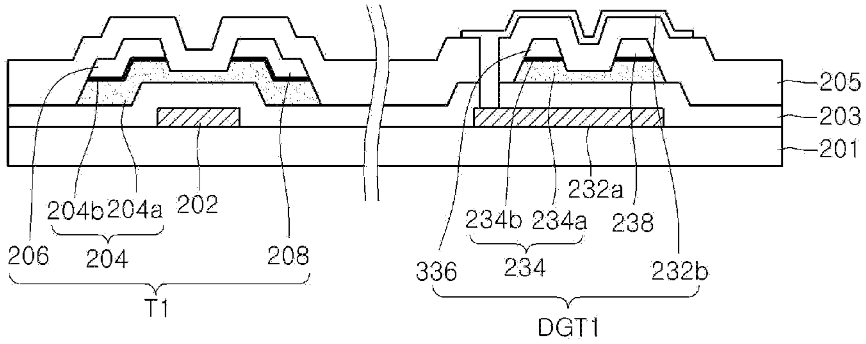
FIG. 6 is a cross-sectional view showing structures of the first dual gate transistor of FIG. 4 and the first dual gate transistor of FIG. 5.

FIG. 6 is a cross-sectional view showing structures of the first transistor of FIG. 4 and the first dual gate transistor of FIG. 5.

As shown in FIGS. 4 and 6, the first transistor T1 includes: the gate electrode 202 formed on a substrate 201; the gate insulating film 203 formed on the substrate 201 having the gate electrode 202; the semiconductor layer 204 formed on the substrate 201, which is covered with the gate insulating film 203, opposite to the gate electrode 202; the source and drain electrodes 206 and 208 being separate from each other on the substrate 201 having semiconductor layer 204; and the passivation layer 205 formed on the entire surface of the substrate 201 having the source and drain electrodes 206 and 208. The semiconductor layer is configured to include an active layer 204*a* formed from amorphous silicon and an ohmic contact layer 204*b* formed from impurity-doped amorphous silicon.

The first dual gate transistor DGT1 includes the bottom gate electrode 232*a*, the gate insulating film 203, the semiconductor layer 234, the source and drain electrodes 236 and 238, the passivation layer 205, and the top gate electrode 232*b*, as shown in FIGS. 5 and 6. The bottom gate electrode 232*a* is formed on the substrate 201. The gate insulating film 203 is formed on the substrate 201 which is provided with the bottom gate electrode 232*a*. The semiconductor layer 234 is formed on the substrate 201, which is covered with the gate insulating film 203, opposite to the bottom gate electrode 232*a*. In other words, the semiconductor layer 234 is disposed on the gate insulating film 203 opposite to the bottom gate electrode 232*a*. Such a semiconductor layer 234 is configured to include an active layer 234*a* and an ohmic contact layer 234*b*. The source and drain electrodes 236 and 238 are formed on the substrate 201 which is provided with the semiconductor layer 234. The source and drain electrodes 236 and 238 are separated from each other. The passivation layer 205 is formed on the entire surface of the substrate 201 having the source and drain electrodes 236 and 238. The top gate electrode 232*b* is formed on the substrate 201 covered with the passivation layer 205 and electrically connected to the bottom gate electrode 232*a* via a contact hole which penetrates through the passivation layer 205 and the gate insulating film 203.

Figure 7A:
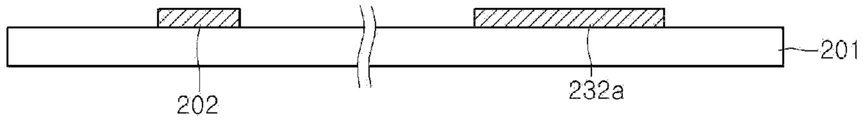
FIGS. 7A and 7E are views used to explain processes of manufacturing the first transistor and the first dual gate transistor of FIG. 6.
Figure 7B:
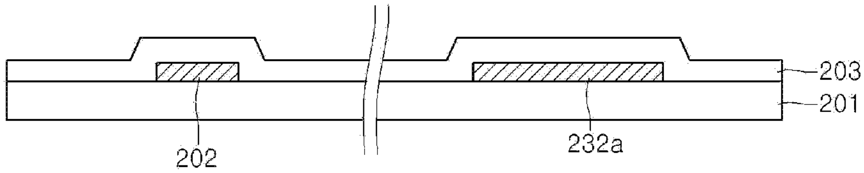
Figure 7C:
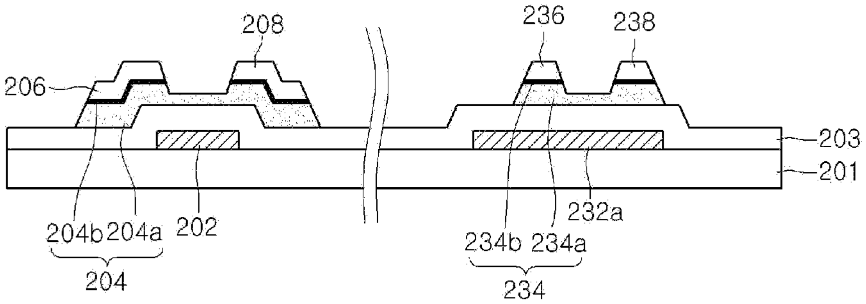
Figure 7D:
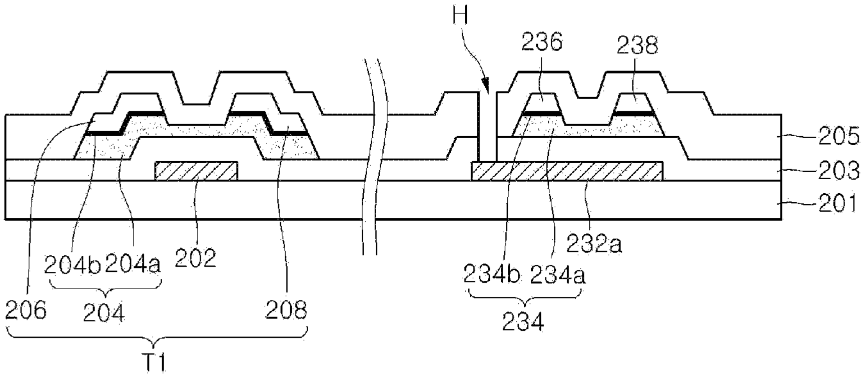
Figure 7E:
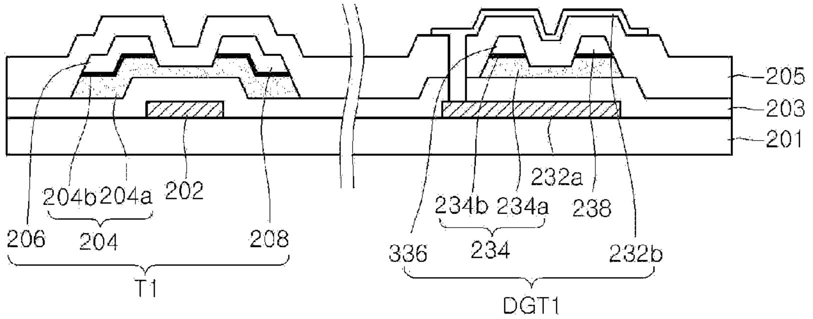

FIGS. 7A and 7E are views used to explain processes of manufacturing the first transistor and the first dual gate transistor of FIG. 6.

As shown in FIG. 7A, the gate electrode 202 of the first transistor T1 and the bottom gate electrode 232*a* of the first dual gate transistor DGT1 are formed on the substrate 201 by depositing one material selected from a conductive metal group including aluminum (Al), aluminum alloys (for example, AlNd), tungsten (W), chrome (Cr), Molybdenum (Mo), and so on, and by patterning the deposited conductive metal film.

Subsequently, the gate insulating film 203 is formed on the substrate 201 which is provided with the gate electrode 202 and the bottom gate electrode 232*a*, as shown in FIG. 7B. The gate insulating film 203 is formed by depositing one material selected from an inorganic insulation material group including silicon nitride (SiNx), silicon oxide (a-Si:H), and so on. In another way, the gate insulating film 203 can also be formed by depositing one organic insulation material such as benzocyclobutane (BCB), acrylic-based resin, and so on.

An amorphous silicon (a-Si:H) layer is formed on the substrate 201 covered with the gate insulating film 203 through a depositing process. The deposited amorphous silicon layer is then patterned through a mask process. The patterned amorphous silicon layer is used as the active layers 204*a* and 234*a* of the first transistor T1 and first dual gate transistor DGT1, as shown in FIG. 7C.

An impurity-doped amorphous silicon (n+a-Si:H) layer and a conductive metal film are sequentially formed on the substrate 201, which is provided with the active layers 204*a* and 234*a* of the first transistor T1 and first dual gate transistor DGT1, through a depositing process. Then, the impurity-doped amorphous silicon (n+a-Si:H) layer and conductive metal film are continuously patterned through a mask process. The patterned, impurity-doped amorphous silicon layer is used as the ohmic contact layers 204*b* and 234*b* of the first transistor T1 and first dual gate transistor DGT1. The patterned conductive metal film is used as the source and drain electrodes 206 and 208 of the first transistor T1 and the source and drain electrodes 236 and 238 of the first dual gate transistor DGT1. The source and drain electrodes 206 and 208 of the first transistor T1 and the source and drain electrodes 236 and 238 of the first dual gate transistor DGT1 can be formed from one material selected from a conductive metal group including aluminum (Al), aluminum alloys (for example, AlNd), tungsten (W), chrome (Cr), Molybdenum (Mo), and so on.

The passivation layer 205 is formed on the entire surface of the substrate 201 which is provided with the source and drain electrodes 206 and 208 of the first transistor T1 and the source and drain electrodes 236 and 238 of the first dual gate transistor DGT1, as shown in FIG. 7D. The passivation layer 205 protects the source and drain electrodes 206 and 208 of the first transistor T1 and the source and drain electrodes 236 and 238 of the first dual gate transistor DGT1 from the intrusion of alien substances. The passivation layer 205 also protects the semiconductor layers 204 and 234 of the first transistor T1 and first dual gate transistor DGT1 from the intrusion of alien substances. In addition, a contact hole H partially exposing the bottom gate electrode 202*a* is formed on the substrate 201 covered with the passivation layer 205. In other words, a part of the bottom gate electrode 232*a* is exposed to the exterior between the contact hole H which is formed to penetrate through the passivation layer 205 and the gate insulating film 203.

Thereafter, a conductive metal film is formed on the entire surface of the substrate 201 which is covered with the passivation layer 205 and which includes the contact hole H. The conductive metal film is connected to the partially exposed bottom gate electrode 232*a* via the contact hole H. The conductive metal film can be formed from the same material as the bottom gate electrode 232*a*.

Such a conductive metal film formed on the entire surface of the substrate 201 is patterned through a mask process, as shown in FIG. 7E. The patterned conductive metal film is formed only at the same position opposite to the bottom gate electrode 232*a*. In other words, the patterned conductive metal film is formed only on a region corresponding to the first dual gate transistor DGT1, while it is not formed another region corresponding to the first transistor T1. This patterned conductive metal film is used for the top gate electrode 232*b*.

In this manner, the top gate electrode 232*b* of the first dual gate transistor DGT1 is electrically connected to the bottom gate electrode 232*a*. As such, when a drive signal is applied to the bottom gate electrode 232*a*, the drive signal is applied to the top gate electrode 232*b*, as well. Accordingly, the first dual gate transistor DGT1 with the bottom and top gate electrodes 232*a* and 232*b* electrically connected to each other has a faster response time than the first transistor T1 with only one gate electrode 202. In other words, the first dual gate transistor DGT1 can reduce charging and discharging times, compared to the first transistor T1.

Furthermore, if the dual gate transistor DGT with the bottom and top gate electrodes electrically connected to each other is included in the output portion 100 of the first shift register ST1, the first shift register ST1 of the present embodiment can rapidly apply the scan signal to the gate line GL, in comparison with the related art first shift register ST1. As such, a thin film transistor connected to the gate line GL in a pixel region is rapidly turned-on/off, thereby improving the response time of the liquid crystal.

Moreover, the dual gate transistor DGT with the bottom and top gate electrodes 232*a* and 232*b* connected to each other can be included not only in the output portion 100 of the first shift register ST1 but also in the control portion of the first shift register ST1, as described above. In this case, the first shift register ST1 according to the present embodiment can rapidly apply the scan signal to the gate line GL in comparison with a first shift register ST1 of the related art.

Figure 8:
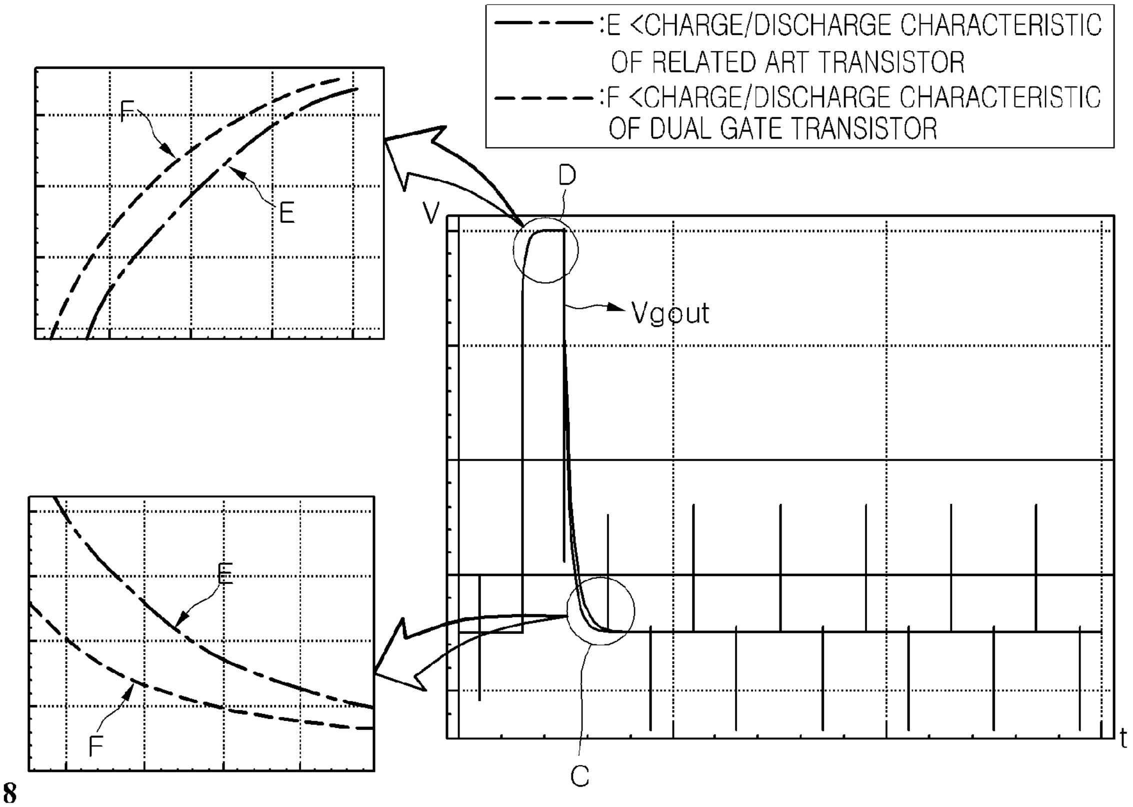
FIG. 8 is a graphic diagram comparatively showing the charging/discharging times of ordinary and dual gate transistors.

FIG. 8 is a graphic diagram comparatively showing the charging/discharging times of ordinary and dual gate transistors.

As seen from FIG. 8, the shift register ST of the present embodiment with the dual gate transistors reduces the charging time by about 0.54 μs in comparison with the related art shift register including only the ordinary transistors, with regards to the rising edge of a scan signal Vgout which is applied to the gate line GL. Also, the shift register ST of the present embodiment including the dual gate transistors reduces the discharging time by about 3.34 μs in comparison with the related art shift register ST including only the ordinary transistors, in the falling edge of a scan signal Vgout.

Although the response characteristics shown in FIG. 8 are experimental data, it is evident that the shift register ST of the present embodiment including the dual gate transistor with the top and bottom gate electrodes which are connected to each other charges and discharges the scan signal faster than the related art shift register ST including only the ordinary transistors.

Therefore, since the dual gate transistor DGT with the bottom and top gate electrodes electrically connected to each other is included in the output portion 100 of the shift register ST, the shift register ST according to a first embodiment of the present disclosure can rapidly apply the scan signal to the gate line GL in comparison with the related art shift register ST. As such, a thin film transistor connected to the gate line GL in a pixel region is also rapidly turned-on/off, thereby improving the response time of the liquid crystal.

Figure 9:
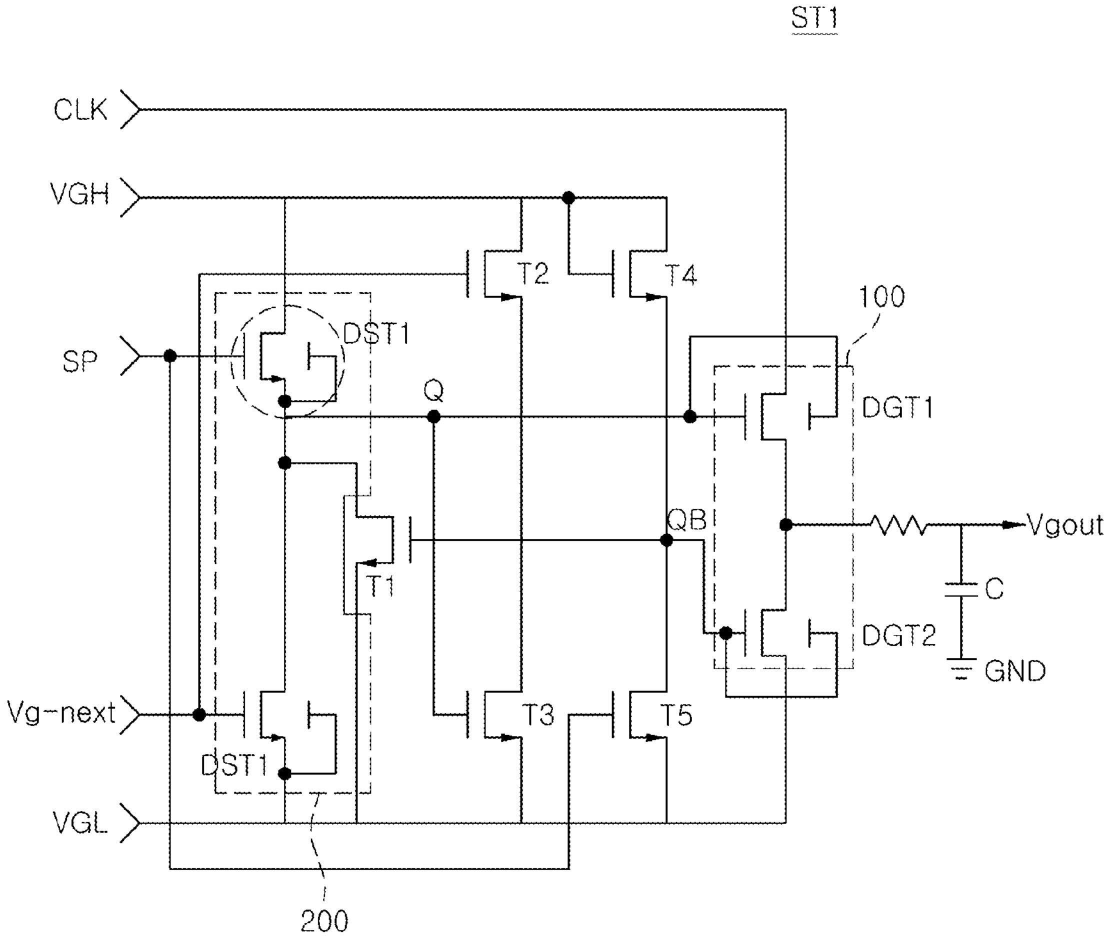
FIG. 9 is a view showing in detail a circuit configuration according a second embodiment of the first shift register shown in FIG. 1.

FIG. 9 is a view showing in detail a circuit configuration according a second embodiment of the first shift register shown in FIG. 1.

Referring to FIGS. 1 and 9, the first shift register ST1 inputs the start pulse SP, the clock signal CLK, and an output signal Vg-next of the second shift register ST2 corresponding to the next stage thereof. A gate high voltage VGH and a gate low voltage VGL are also applied to the first shift register ST1. Such a first shift register ST1 is configured to include an input portion 200 with first and second dual source transistors DST1 and DST2, a control portion with first to seventh transistors T1~T5, and an output portion 100 with first and second dual gate transistors DGT1 and DGT2.

More specifically, the input portion 200 of the first shift register ST1 is configured to include the first dual source transistor DST1 responding to the start pulse ST, and the second dual source transistor DST2 responding to the output signal Vg-next of the second shift register ST2. The first dual source transistor DST1 is connected between a gate high voltage line VGH and a first node Q. The second dual source transistor DST2 is connected between the first node Q and a gate low voltage line VGL.

The first dual source transistor DST1 is configured to include a gate electrode connected to a start pulse line SP, a drain electrode connected to the gate high voltage line VGH, and bottom and top source electrodes commonly connected to the first node Q. The second dual source transistor DST2 is configured to include a gate electrode connected to an output line of the second shift register ST2, a drain electrode connected to the first node Q, and bottom and top source electrodes commonly connected to the gate low voltage line VGL.

The control portion of the first shift register ST1 is configured to the first transistor T1 responding to a voltage on a second node QB. The first transistor T1 is connected between the first node Q (i.e., the source electrodes of the first dual source transistor DST1) and the gate low voltage line VGL.

The control portion of the first shift register ST1 is further configured to include the second transistor T2 responding to the output signal Vg-next of the second shift register ST2, and the third transistor T3 responding to the voltage on the first node Q. The second transistor T2 is connected between the gate high voltage line VGH and the second node QB. The third transistor T3 is connected between the second node QB and the gate low voltage line VGL.

Such a second transistor T2 is selectively turned-on (or activated) depending on the output signal Vg-next which is applied from the second shift register ST2, so that the gate high voltage VGH from the gate high voltage line VGH is be charged into the second node QB. The gate high voltage VGH charged into the second node QB forces the second dual gate transistor DGT2 to be turned-on. As such, the output voltage Vgout on the first gate line GL1 has a low logical state. The third transistor T3 has the similar function as the second transistor T2. However, the third transistor T3 is selectively turned-on depending on the voltage applied from the first node Q, unlike the second transistor T2 responding to the output signal Vg-next which is applied from the second shift register ST2.

Moreover, the control portion of the first shift register ST1 is configured to include the fourth transistor T4 responding to the gate high voltage VGH, and the fifth transistor T5 responding to the start pulse SP. The fourth transistor T4 is connected between the gate high voltage line VGH and the second node QB. The fifth transistor T5 is connected between the second node QB and the gate low voltage line VGL. These fourth and fifth transistors T4 and T5 are used to function as bias resistors for eliminating noise which can be generated in the output portion 100. The fourth transistor T4 is used to function as a full-up resistor for the voltage on the second node QB. The fifth transistor T5 is used for improving the turning-off time of the second dual gate transistor DGT2.

The output portion 100 of the first shift register ST1 is configured to include the first and second dual gate transistors DGT1 and DGT2. The first dual gate transistor DGT1 selectively applies the clock signal CLK to the first gate line GL1 opposite to the first shift register ST1 according to the voltage on the first node Q. The second dual gate transistor DGT2 responds to the voltage on the second node QB and selectively discharges the output signal of the first dual gate transistor DGT1 on the first gate line GL1.

Such a first dual gate transistor DGT1 is configured to include a bottom gate electrode connected to the first node Q, a drain electrode connected to the clock signal line CLK, a source electrode connected to the first gate line GL1, and a top gate electrode connected to the first node Q together with the bottom gate electrode. On the other hand, the second dual gate transistor DGT2 is configured to include a bottom gate electrode connected to the second node QB, a drain electrode connected to the first gate line GL1, a source electrode connected to the gate low voltage line VGL, and a top gate electrode connected to the second node QB together with the bottom gate electrode.

In this manner, the first and second dual gate transistors DGT1 and DGT2 each include the bottom and top gate electrodes electrically connected to each other. As such, the first and second dual gate transistors DGT1 and DGT2 can have the fast charging/discharging times in comparison with the ordinary transistor which is provided with only the bottom gate electrode.

Furthermore, the first through fifth transistors T1 through T5 included in the control portion can be replaced with the dual gate transistors in the same manner as the output portion 100 when it is necessary. If at least part of the first through fifth transistors T1 through T5 within the control portion of the first shift register ST1 are replaced with the dual gate transistors with the bottom and top gate electrodes, the charging and discharging times (or rates) in the control portion are proceeded more rapidly. As such, the scan signal can be also applied rapidly to the gate line GL.

Also, the first and second dual source transistors DST1 and DST2 included in the input portion 200 of the shift register ST1 is configured to each include the bottom and top source electrodes electrically connected to each other. Therefore, the first and second dual source transistors DST1 and DST2 can have the fast turning-off time in comparison with the ordinary transistor which is provided with only one source electrode.

Moreover, the first through fifth transistors T1 through T5 included in the control portion can be replaced with the dual source transistors in the same manner as the input portion 200 when it is necessary. If at least part of the first through fifth transistors T1 through T5 within the control portion of the first shift register ST1 are replaced with the dual source transistors with the bottom and top source electrodes, the turning-off time (or rates) in the control portion of the first shift register ST1 becomes rapider.

Figure 10:
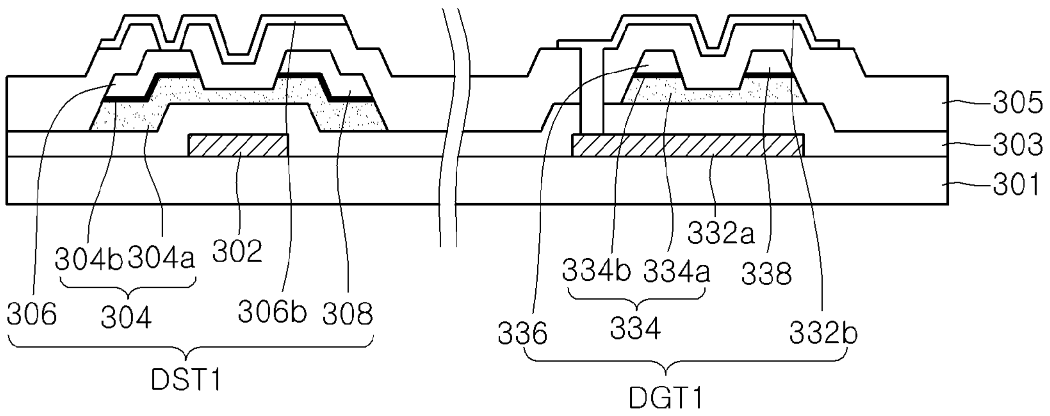
FIG. 10 is a cross-sectional view showing structures of the first dual source transistor and the first dual gate transistor of FIG. 9.

FIG. 10 is a cross-sectional view showing structures of the first dual source transistor and the first dual gate transistor of FIG. 9.

As shown in FIG. 10, the first dual source transistor DST1 includes a gate electrode 302, a gate insulating film 303, a semiconductor layer 304, a bottom source electrode 306*a*, a drain electrode 308, a passivation layer 305, and a top source electrode 306*b*. The gate electrode 302 is formed on the substrate 301. The gate insulating film 303 is formed on the substrate 301 which is provided with the gate electrode 302. The semiconductor layer 304 is formed on the substrate 301, which is covered with the gate insulating film 303, opposite to the gate electrode 302. In other words, the semiconductor layer 304 is disposed on the gate insulating film 303 opposite to the gate electrode 302. The bottom source electrode 306*a* and the drain electrode 308 are formed on the substrate 301, which is provided with the semiconductor layer 304, in such a manner as to be separated from each other. The passivation layer 305 is formed on the entire surface of the substrate 301 having the bottom source electrode 306*a* and drain electrode 308. The top source electrode 306*b* is formed on the substrate 301 covered with the passivation layer 305. Also, the top source electrode 306*b* is electrically connected to the bottom source electrode 306*a* via a contact hole which is formed to penetrate through the passivation layer 305. Such a semiconductor layer 304 is configured to include an active layer 304*a* formed from amorphous silicon and an ohmic contact layer 304*b* formed from impurity-doped amorphous silicon.

On the other hand, the first dual gate transistor DGT1 includes a bottom gate electrode 332*a*, the gate insulating film 303, a semiconductor layer 334, source and drain electrodes 336 and 338, the passivation layer 305, and a top gate electrode 332*b*. The bottom gate electrode 332*a* is formed on the substrate 301. The gate insulating film 303 is formed on the substrate 301 which is provided with the bottom gate electrode 332*a*. The semiconductor layer 334 is formed on the substrate 301, which is covered with the gate insulating film 303, opposite to the bottom gate electrode 332*a*. In other words, the semiconductor layer 334 is disposed on the gate insulating film 303 opposite to the bottom gate electrode 332*a*. Such a semiconductor layer 334 is configured to include an active layer 334*a* and an ohmic contact layer 334*b*. The source and drain electrodes 336 and 338 are formed on the substrate 301 which is provided with the semiconductor layer 334. The source and drain electrodes 336 and 338 are separated from each other. The passivation layer 305 is formed on the entire surface of the substrate 301 having the source and drain electrodes 336 and 338. The top gate electrode 332*b* is formed on the substrate 301 covered with the passivation layer 305. Also, the top gate electrode 332*b* is electrically connected to the bottom gate electrode 332*a* via a contact hole which is formed to penetrate through the passivation layer 305 and the gate insulating film 303.

Figure 11A:
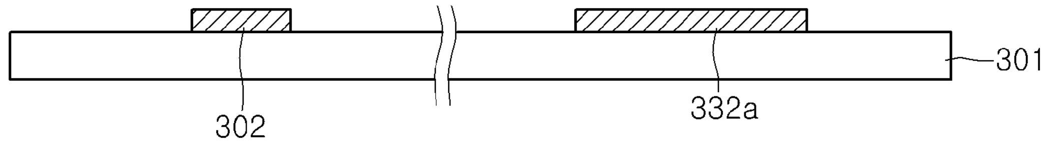
FIGS. 11A and 11E are cross-sectional views used to explain processes of manufacturing the first dual source transistor and the first dual gate transistor of FIG. 10.
Figure 11B:
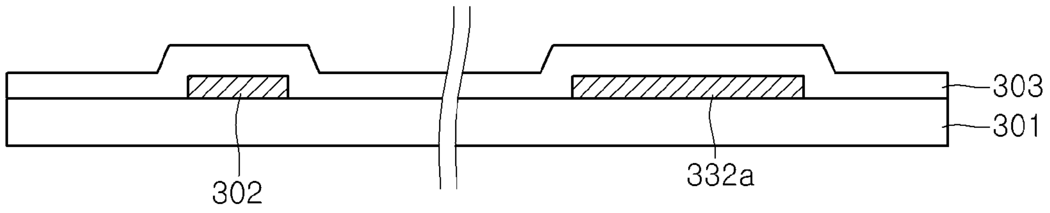
Figure 11C:
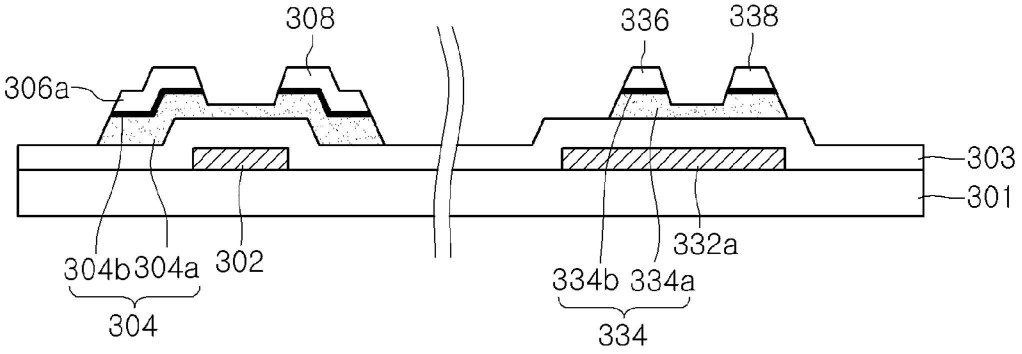
Figure 11D:
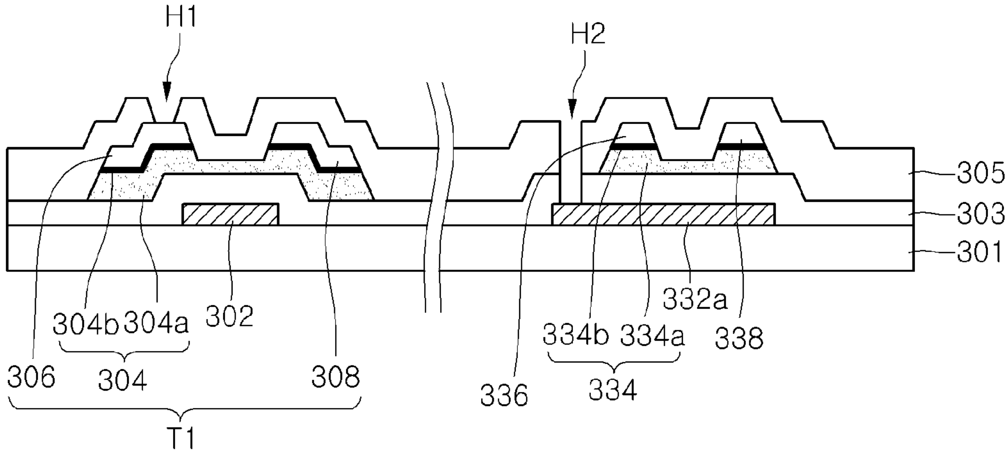
Figure 11E:
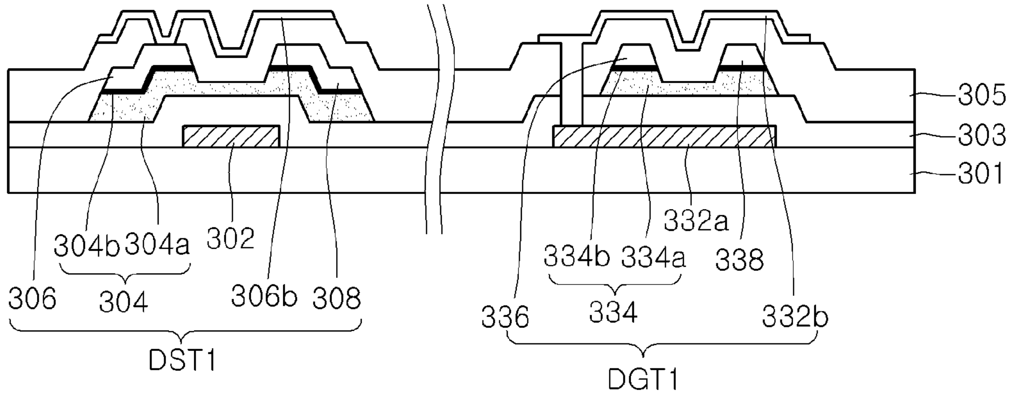

FIGS. 11A and 11E are cross-sectional views used to explain processes of manufacturing the first dual source transistor and the first dual gate transistor of FIG. 10.

As shown in FIG. 11A, the gate electrode 302 of the first dual source transistor DST1 and the bottom gate electrode 332*a* of the first dual gate transistor DGT1 are formed on the substrate 301 by depositing one material selected from a conductive metal group including aluminum (Al), aluminum alloys (for example, AlNd), tungsten (W), chrome (Cr), Molybdenum (Mo), and so on, and by patterning the deposited conductive metal film.

Subsequently, the gate insulating film 303 is formed on the substrate 301 which is provided with the gate electrode 302 and the bottom gate electrode 332*a*, as shown in FIG. 11B. The gate insulating film 303 is formed by depositing one material selected from an inorganic insulation material group including silicon nitride (SiNx), silicon oxide (a-Si:H), and so on. In another way, the gate insulating film 303 can also be formed by depositing one organic insulation material such as benzocyclobutane (BCB), acrylic-based resin, and so on.

An amorphous silicon (a-Si:H) layer is formed on the substrate 301 covered with the gate insulating film 303 through a depositing process. The deposited amorphous silicon layer is then patterned through a mask process. The patterned amorphous silicon layer is used as the active layers 304*a* and 334*a* of the first dual source transistor DST1 and first dual gate transistor DGT1, as shown in FIG. 11C.

An impurity-doped amorphous silicon (n+a-Si:H) layer and a conductive metal film are sequentially formed on the substrate 301, which is provided with the active layers 304*a* and 334*a* of the first dual source transistor DST1 and first dual gate transistor DGT1, through a depositing process. Then, the impurity-doped amorphous silicon (n+a-Si:H) layer and conductive metal film are continuously patterned through a mask process. The patterned, impurity-doped amorphous silicon layer is used as the ohmic contact layers 304*b* and 334*b* of the first dual source transistor DST1 and first dual gate transistor DGT1. The patterned conductive metal film is used as the bottom source electrode 306*a* and drain electrode 308 of the first dual source transistor DST1 and the source and drain electrodes 336 and 338 of the first dual gate transistor DGT1. The bottom source electrode 306*a* and drain electrode 308 of the first dual source transistor DST1 and the source and drain electrodes 336 and 338 of the first dual gate transistor DGT1 can be formed from one material selected from a conductive metal group including aluminum (Al), aluminum alloys (for example, AlNd), tungsten (W), chrome (Cr), Molybdenum (Mo), and so on.

The passivation layer 305 is formed on the entire surface of the substrate 301 which is provided with the bottom source electrode 306*a* and drain electrode 308 of the first dual source transistor DST1 and the source and drain electrodes 336 and 338 of the first dual gate transistor DGT1, as shown in FIG. 11D. The passivation layer 305 protects the bottom source electrode 306*a* and drain electrode 308 of the first dual source transistor DST1 and the source and drain electrodes 336 and 338 of the first dual gate transistor DGT1 from the intrusion of alien substances. The passivation layer 305 also protects the semiconductor layers 304 and 334 of the first dual source transistor DST1 and first dual gate transistor DGT1 from the intrusion of alien substances.

Thereafter, a first contact hole H1 partially exposing the bottom source electrode 306*a* of the first dual source transistor DST1 is formed on the substrate 301 covered with the passivation layer 305. At the same time, a second contact hole H2 partially exposing the bottom gate electrode 332*a* is formed on the substrate 301 covered with the passivation layer 305. In other words, the bottom source electrode 306*a* is partially exposed to the exterior between the first contact hole H1 which is formed to penetrate through the passivation layer 305. The bottom gate electrode 332*a* is partially exposed to the exterior between the second contact hole H2 which is formed to penetrate through the passivation layer 305 and the gate insulating film 303.

Subsequently, a conductive metal film is formed on the entire surface of the substrate 301 which is covered with the passivation layer 305 including the first and second contact holes H1 and H2. The conductive metal film is connected to the partially exposed bottom source electrode 306*a* of the first dual source transistor DST1 via the first contact hole H1. Also, conductive metal film is connected to the bottom gate electrode 332*a* of the first dual gate transistor DGT1 via the second contact hole H2.

Such a conductive metal film formed on the entire surface of the substrate 301 is patterned through a mask process, as shown in FIG. 11E. The patterned conductive metal film is formed at the same position opposite to the bottom source electrode 306*a*. Also, the pattern conductive metal film is formed at the same position opposite to the bottom gate electrode 332*a*. Consequently, the patterned conductive metal film is used for the top source electrode 306*b* of the first dual source transistor DST1 and the top gate electrode 332*b* of the first dual gate transistor DGT1.

In this manner, the bottom gate electrode 332*a* of the first dual gate transistor DGT1 is electrically connected to the top gate electrode 332*b*. As such, when a drive signal is applied to the bottom gate electrode 332*a*, the drive signal is applied to the top gate electrode 332*b*, as well. Accordingly, the first dual gate transistor DGT1 with the bottom and top gate electrodes 332*a* and 332*b* connected to each other has a faster response time than the ordinary transistor with only one gate electrode.

Also, the bottom source electrode 306*a* of the first dual source transistor DST1 is electrically connected to the top source electrode 306*b*. As such, when a data signal is applied to the bottom source electrode 306*a*, the data signal is also applied to the top source electrode 306*b*. Therefore, the first dual source transistor DST1 with the bottom and top source electrodes 306*a* and 306*b* connected to each other has a faster response time (more specifically, a faster turning-off time) than the ordinary transistor with only one source electrode.

Furthermore, if the dual gate transistor DGT is included in the output portion 100 of the first shift register ST1 and the dual source transistor DST is included in the input portion 200 of the first shift register ST1, the first shift register ST1 of the present embodiment can more rapidly apply the scan signal to the gate line GL, in comparison with the related art shift register ST. Therefore, a thin film transistor connected to the gate line GL in a pixel region is rapidly turned-on/off. As a result, the response time of the liquid crystal can be improved.

Moreover, the dual gate transistor DGT with the bottom and top gate electrodes 332*a* and 332*b* which is connected to each other can be included not only in the output portion 100 of the first shift register ST1 but also in the control portion of the first shift register ST1, as described above. In this case, the first shift register ST1 according to the present embodiment can more rapidly apply the scan signal to the gate line GL in comparison with the related art first shift register ST1.

Alternatively, the dual source transistor DST with the bottom and top source electrodes 306*a* and 306*b* which is connected to each other can be included not only in the input portion 200 of the first shift register ST1 but also in the control portion of the first shift register ST1. As such, the first shift register ST1 according to the present embodiment can more rapidly apply the scan signal to the gate line GL in comparison with the related art first shift register ST1.

As described above, the LCD devices according to embodiments of the present disclosure allow the scan signal output portion of the shift register to include the dual gate transistor so that the scan signal output portion of the shift register is rapidly driven. As such, the charging/discharging times of thin film transistors on a LCD panel are also rapid. As a result, the response time of the liquid crystal can be improved.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A liquid crystal display device, comprising:

a display panel configured to display an image and comprising a plurality of gate lines and a plurality of data lines arranged thereon;

a data driver configured to supply the data lines of the display panel with data signals corresponding to the image; and a gate driver formed on the display panel and comprising a plurality of shift registers configured to sequentially shift a start pulse to be applied to the gate lines, each of the shift registers comprising:

an output portion comprising first and second dual gate transistors, wherein:

the first dual gate transistor comprises:

first and second gate electrodes configured to be responsive to a voltage on a first node;

a drain electrode configured to receive a clock signal; and a source electrode connected to the respective gate line and configured to selectively apply the clock signal on the drain electrode to the respective gate line according to the voltage on the first node, and the second dual gate transistor comprises:

first and second gate electrodes configured to be responsive to a voltage on a second node;

a source electrode configured to receive a first source voltage; and a drain electrode connected to the respective gate line and configured to selectively apply the first source voltage to the respective gate line according to the voltage on the second node; and a control portion configured to control the voltages on the first and second nodes, wherein each of the first and second dual gate transistors comprises:

the first gate electrode formed on a substrate, a gate insulating film formed on the substrate with the first gate electrode, a semiconductor layer formed, opposite the first gate electrode, on the substrate with the gate insulating film, the source and drain electrodes being separate from each other on the semiconductor layer, a passivation layer formed on the source and drain electrodes and comprising a contact hole, the second gate electrode formed, opposite the semiconductor layer, on the passivation layer and electrically connected to the first gate electrode through a contact hole on the passivation layer, and a connection electrode extending from an end of the second gate electrode, comprising the same material as a material of at least one of the first and second gate electrodes, and electrically connected to an end of a top surface of the first gate electrode through the contact hole of the passivation layer, and wherein the connection electrode and the second gate electrode are a single body.

2. The liquid crystal display device claimed as claim 1, wherein the second gate electrode is formed from the same conductive metal as the first gate electrode.

3. The liquid crystal display device claimed as claim 1, wherein the first dual gate transistor responds to the voltage on the first node and charges the output signal in the respective gate line.

4. The liquid crystal display device claimed as claim 3, wherein the second dual gate transistor responds to the voltage on the second node and discharges the output signal which is output to the respective gate line by the first dual gate transistor.

5. The liquid crystal display device claimed as claim 1, wherein the control portion is configured to comprise a plurality of transistors which include at least one dual gate transistor with first and second gate electrodes electrically connected to each other.

6. A liquid crystal display device comprising:

a display panel configured to display an image and comprising a plurality of gate lines and a plurality of data lines arranged thereon;

a data driver configured to supply the data lines of the display panel with data signals corresponding to the image; and a gate driver formed on the display panel and comprising a plurality of shift registers configured to sequentially shift a start pulse to be applied to the gate lines, each of the shift registers comprising:

an input portion comprising first and second dual source transistors, wherein:

the first dual source transistor comprises:

a gate electrode configured to be responsive to the start pulse;

a drain electrode configured to receive a first source voltage; and first and second source electrodes connected to a first node, and the second dual source transistor comprises:

a gate electrode configured to be responsive to an output signal of the next shift register;

a drain electrode connected to the first node; and first and second source electrodes configured to receive a second source voltage;

an output portion comprising first and second dual gate transistors, wherein:

the first dual gate transistor comprises:

first and second gate electrodes configured to be responsive to a voltage on the first node;

a drain electrode configured to receive a clock signal; and a source electrode connected to the respective gate line and configured to selectively apply the clock signal on the drain electrode to the respective gate line according to the voltage on the first node, and the second dual gate transistor comprises:

first and second gate electrodes configured to be responsive to a voltage on a second node;

a source electrode configured to receive a first source voltage; and a drain electrode connected to the respective gate line and configured to selectively apply the first source voltage to the respective gate line according to the voltage on the second node; and a control portion disposed between the input and output portions and configured to control the voltages on the first and second nodes, wherein each of the first and second dual gate transistors comprises:

the first gate electrode formed on a substrate;

a gate insulating film formed on the substrate with the first gate electrode, a semiconductor layer formed, opposite the first gate electrode, on the substrate with the gate insulating film, the source and drain electrodes being separate from each other on the semiconductor layer, a passivation layer formed on the source and drain electrodes and comprising a contact hole, the second gate electrode formed, opposite the semiconductor layer on the passivation layer and electrically connected to the first gate electrode through a contact hole on the passivation layer, and a connection electrode extending from an end of the second gate electrode, comprising the same material as a material of at least one of the first and second gate electrodes, and electrically connected to an end of a top surface of the first gate electrode through the contact hole of the passivation layer, and wherein the connection electrode and the second gate electrode are a single body.

7. The liquid crystal display device claimed as claim 6, wherein the control portion is configured to comprise a plurality of transistors which include at least one dual gate transistor with first and second gate electrodes electrically connected to each other.

8. The liquid crystal display device claimed as claim 6, wherein the second gate electrode is formed from the same conductive metal as the first gate electrode.

9. The liquid crystal display device claimed as claim 6, wherein the first dual gate transistor responds to the voltage on the first node and charges the output signal in the respective gate line.

10. The liquid crystal display device claimed as claim 9, wherein the second dual gate transistor responds to the voltage on the second node and discharges the output signal which is output to the respective gate line by the first dual gate transistor.

11. The liquid crystal display device claimed as claim 6, wherein the first and second source electrodes of the first dual source transistor are electrically connected to each other, and the first and second source electrodes of the second dual source transistor are electrically connected to each other.

12. The liquid crystal display device claimed as claim 11, wherein the control portion is configured to comprise a plurality of transistors which include at least one dual source transistor with first and second source electrodes electrically connected to each other.

13. The liquid crystal display device claimed as claim 6, wherein the first and second dual source transistors each include:

the gate electrode formed on a substrate;

a gate insulating film formed on the substrate with the gate electrode;

a semiconductor layer formed, opposite the gate electrode, on the substrate with the gate insulating film;

the first source electrode and the drain electrode being separate from each other on the semiconductor layer;

a passivation layer formed on the first source electrode and drain electrode; and the second source electrode formed, opposite the semiconductor layer, on the passivation layer and electrically connected to the first source electrode through a contact hole on the passivation layer.

14. The liquid crystal display device claimed as claim 13, wherein the second source electrode is formed from the same conductive metal as the first source electrode.

* * * * *